United States Patent [19]

Conrad

[11] Patent Number: 4,738,457

[45] Date of Patent: Apr. 19, 1988

[54] CONVERTIBLE HANDLE FOR VEHICLE

[76] Inventor: Charles W. Conrad, 1668 Kings Down Cir., Dunwoody, Ga. 30338

[21] Appl. No.: 20,968

[22] Filed: Mar. 3, 1987

[51] Int. Cl.[4] ............................................. B62B 1/12
[52] U.S. Cl. ............................. 280/47.26; 280/47.33; 280/47.37 R; 280/204
[58] Field of Search .................. 280/656, 47.26, 47.33, 280/47.37 R, 415 R, 204, 289 A, 47.18

[56] References Cited

U.S. PATENT DOCUMENTS 4,037,853  7/1977  Sparks ......................... 280/47.37 R
4,274,649  6/1981  Vanderhorst et al. ........... 280/47.26

FOREIGN PATENT DOCUMENTS 817091  10/1951  Fed. Rep. of Germany ... 280/47.26

Primary Examiner—John J. Love
Assistant Examiner—Eric D. Culbreth
Attorney, Agent, or Firm—James B. Middleton

[57] ABSTRACT

A convertible handle for a cargo vehicle can be used for manually pushing the vehicle or for connecting the vehicle to a tractor. The handle has a towing part that can be used either as a stand or a towbar, and a grip part that can be used either as a grip or as structural support for the vehicle body. The handle rotates from one position to the other, pivoting about a pivot on the vehicle body; and, screws or the like fix the handle in the desired position.

4 Claims, 1 Drawing Sheet

U.S. Patent
Apr. 19, 1988
4,738,457
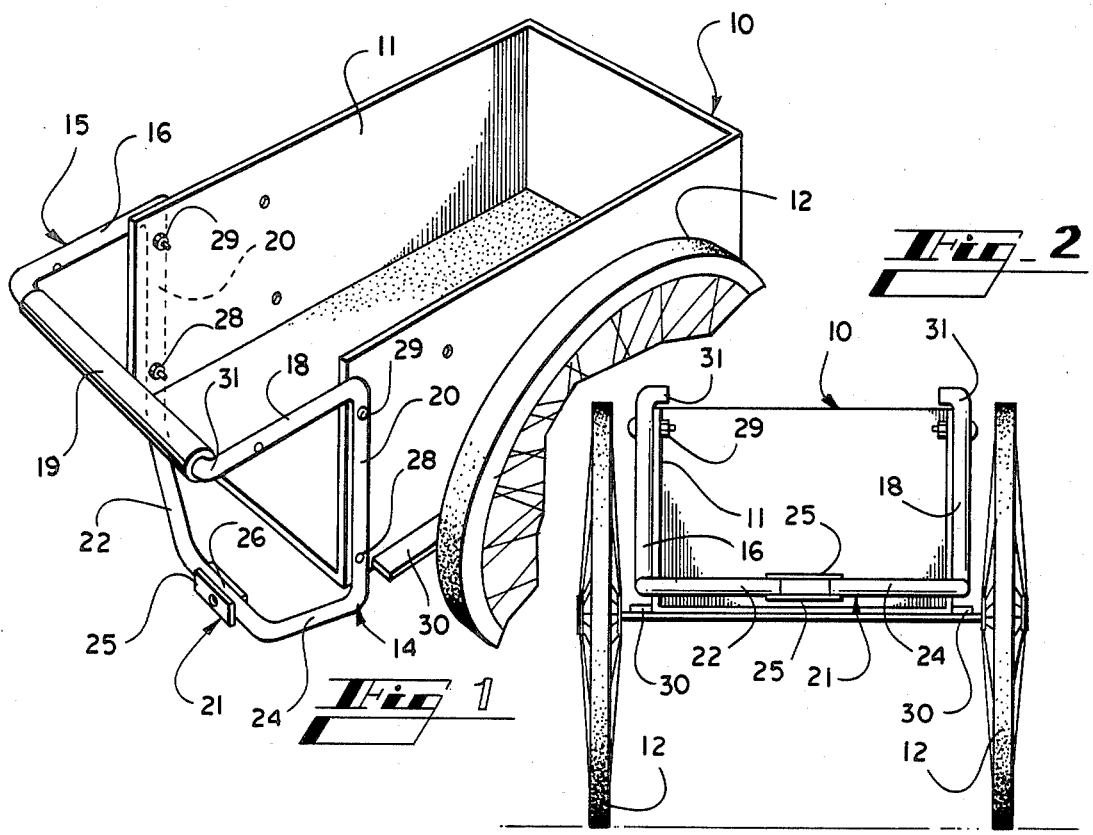
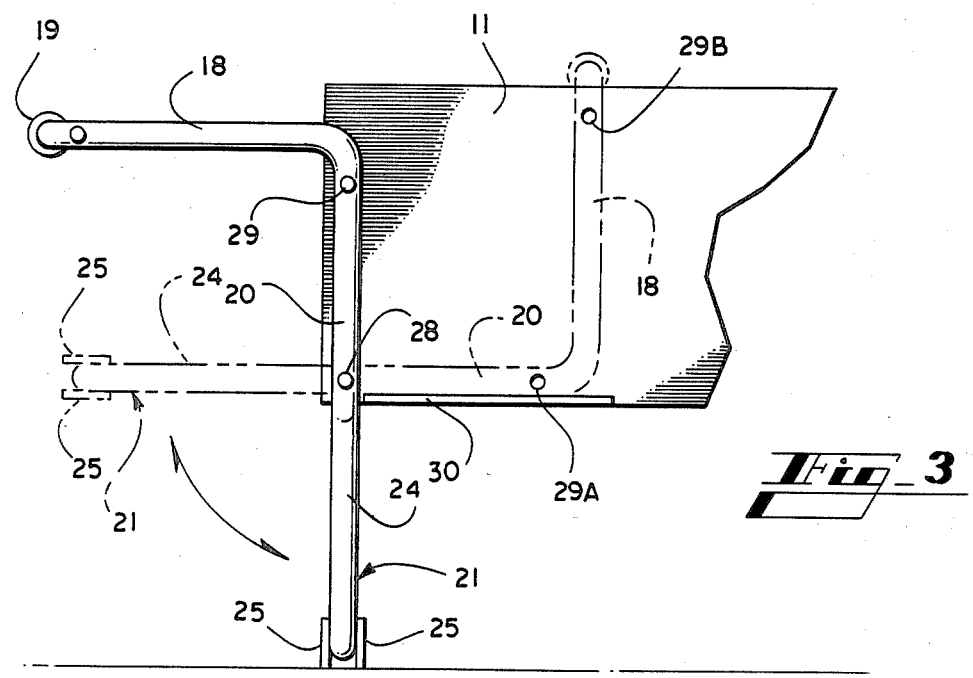

CONVERTIBLE HANDLE FOR VEHICLE

INFORMATION DISCLOSURE STATEMENT

There are numerous instances wherein a cargo vehicle is used for conveying various materials, the vehicle normally utilizing wheels, though such vehicles may also utilize skis or the like as appropriate. It is also very common in the use of such cargo vehicles to utilize a motorized vehicle for transporting the cargo vehicle; and, at other times it may be equally convenient to transport the cargo vehicle by pushing it by hand.

In many areas, motorized vehicles are utilized for transporting cargo-bearing carts, these being common for home use with small garden tractors and the like and for various industrial applications, such as in warehouses, manufacturing facilities and the like. In the past, when a cargo vehicle must be utilized with both a motorized vehicle and hand pushing, the cargo vehicle has been adapted for one form of transportation or the other. Since reasonably sophisticated coupling mechanisms and the like are required for power vehicle transport, the cargo vehicles have generally been adapted for transporting by power vehicle, rendering the cargo vehicle very inconvenient for pushing by hand.

SUMMARY OF THE INVENTION

This invention relates generally to dual use cargo vehicles and the like, and is more particularly concerned with a convertible handle for a cargo vehicle.

The present invention provides a convertible handle for a cargo vehicle, the handle having a first position wherein a gripping portion is conveniently engageable by a person for pushing a cargo vehicle while a towing portion of the handle acts as a stand for the cargo vehicle. The convertible handle is conveniently rotatable with respect to the cargo vehicle so that the towing portion will extend forwardly, the towing portion being adapted for mechanical connection to a motorized vehicle or the like. When the towing portion is disposed for vehicular towing of the cargo vehicle, the gripping portion of the handle is conveniently disposed adjacent to the sides of the vehicle, and may act as additional support for the sides.

The present invention therefore provides an extremely simple handle means for virtually any form of cargo vehicle, the handle means having a first position for convenient manipulation by hand with a stand for supporting the vehicle when unattended, and a second position wherein the handle means has a forwardly extending towing portion for connection to a motorized vehicle.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing a wheeled cart having a convertible handle made in accordance with the present invention, the handle being shown in position for manual pushing;

FIG. 2 is a front elevational view of the cargo vehicle shown in FIG. 1, the handle assembly being rotated to the towing position, FIG. 2 showing a modified form of handle assembly wherein the central gripping portion is omitted; and, FIG. 3 is a side elevational view of the handle assembly shown FIGS. 1 and 2, the handle assembly being shown in full lines as illustrated in FIG. 1, and in broken lines in the position illustrated in FIG. 2.

DETAILED DESCRIPTION OF THE EMBODIMENTS

Referring now more particularly to the drawings, and to those embodiments of the invention here presented by way of illustration, it will be seen that FIG. 1 illustrates a two-wheeled cart of the type that may be utilized for domestic or light industrial use. The cart, or cargo vehicle, is generally indicated at 10 and includes a straight-sided body 11 having wheels such as the wheel 12. At one end of the body 11 there is a handle assembly generally designated at 14.

In the following specification, the end of the cargo vehicle 10 having the handle assembly 14 will be referred to as the "front" of the vehicle. It will of course be realized that, when the vehicle is being pushed one end may be the front, and when the same vehicle is being pulled, the opposite end will be the front. For consistency and clarity of description, the end having the handle 14 thereon will always be referred to as the front regardless of the proposed direction of the vehicle.

Looking first at the handle position as illustrated in FIG. 1, and in full lines in FIG. 3, it will be seen that the handle assembly 14 includes a gripping portion 15 which includes forwardly extending members 16 and 18. The extending ends of these members 16 and 18 are shown as connected by a grip 19.

The gripping portion 15 extends forwardly from a vertical member 20, it being understood that there is a similar member 20 on the opposite side of the vehicle 10; and, the towing portion 21 extends downwardly from the vertical portion 20. As seen in FIG. 1, the towing portion 21 is utilized as a stand portion 21, and these terms will be used interchangably when discussing the present invention.

In FIG. 1 of the drawings, it will be seen that the stand portion 21 includes inwardly angled connecting members 22 and 24 which lead to a lowermost plate 25, the plate 25 being here illustrated as a pair of parallel connecting plates fixed to the angled members 22 and 24. The plates 25 include a hole 26 for use when the plate 25 is used as towing means.

The two vertical members 20 are fixed to the side walls of the body 11 of the vehicle 10. As here shown, there is a lower connection designated at 28, the connection 28 being a pivot for the handle assembly 14. Upwardly of the pivot 28 there is an additional connection 29 for preventing undesirable rotation of the handle assembly 14. Thus, with the fastening means 29 in place, the handle assembly 14 can be utilized as shown in FIG. 1 for manual pushing of the cart, with the stand, or towing portion 21 allowing the cart to stand unattended.

When the handle assembly of the present invention is to be utilized as a towing means, the handle assembly is rotated about the pivot 28 to assume the towing position which is illustrated in FIG. 2 and in broken lines in FIG. 3 of the drawings.

Looking first at FIG. 3 of the drawings, it will be obvious that the fastening means 29 can be removed so the handle assembly 14 can be rotated about the pivot 28. Rotation of the handle assembly 14 is limited by two mechanical stops. While both the mechanical stops may be eliminated if desired, at least one of the mechanical stops is desirable for convenience; and, the two mechanical stops lend additional strength to the overall structure. There is a flange 30 extending outwardly from the body 11 adjacent to the pivot 28. The flange 30 is so disposed that the vertical portion 20 of the handle assembly 14 will engage the flange 30 when the handle assembly 14 is rotated to towing position.

As a second stop, the gripping portion 15 of the handle assembly will engage the sides of the body 11 when the handle assembly 14 is rotated to towing position. Specifically, the forwardly extending members 16 and 18, after rotation, extend upwardly along the sides of the body 11, and can add support to the sides. Also, the ends of the forwardly extending members 18 may include hooks 31 to hook over the uppermost edges of the sides of the body 11. It is this hook 31 that acts as the second stop for the handle assembly 14.

It will also be noticed that, as is shown in FIG. 1, the gripping portion 15 may include a grip 19 that extends between the two forwardly extending portions 16 and 18. In this event, there will be a rigid member completely across the walls of the body 11. Nevertheless, if the presence of the grip 19 across the body 11 is inconvenient, the grip 19 can be omitted as is shown in FIG. 2 of the drawings. Obviously, another alternative is to construct the grip 19 to be removable so the grip 19 can be used when the handle assembly 14 is in the pushing position, and the grip 19 could be removed when the handle assembly is in towing position.

After the handle assembly 14 has been rotated to towing position as shown in FIG. 2, and in broken lines in FIG. 3, some fastening means should be installed to retain that position. A fastening means indicated at 29A can be placed in the vertical member 20, and an additional fastening means 29B can be placed in the portions 16 and 18. While virtually any known fastening means can be utilized, the fastening means are here shown as simple machine screws and nuts. Those skilled in the art will realize that other forms of fastening means that are quicker to engage and disengage are well known in the art and may easily be substituted for the screws and nuts shown. Also, various clamps or the like can be utilized to clamp the handle assembly 14 in the two positions.

From the foregoing discussion, it should be understood that the present invention provides a very simple, convenient and easy to use handle assembly for cargo vehicles. The handle assembly includes a first rotational position for providing a manually usable handle and a stand for the cargo vehicle, and a second rotational position wherein the handle assembly provides towing means and additional mechanical support for the body of the cargo vehicle. The cargo vehicle may be a domestic lawn cart or utility cart, or may be a warehouse truck, baggage vehicle for airports or virtually any other cargo vehicle.

While an elementary form of towing connector is illustrated, it will of course be understood that the plates 25 can be replaced with any form of connector for use with a particular towing system. It will further be understood that, since the various connecting means such as the connectors 29, 29A and 29B are easily releasable, the pivot 28 may be equally easily releasable so the entire handle assembly 14 is easily removable from a particular cargo vehicle. The one handle assembly may therefore be installed and removed as desired, exchanged from one vehicle to another, and retained while the vehicle itself is replaced.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. A convertible handle member in combination with a cargo vehicle whereby said cargo vehicle is selectively adapted for pushing by hand and for towing by motorized vehicle, said cargo vehicle including a body having side walls, said handle member including vertical members pivotally fixed to said side walls of said cargo vehicle, a gripping portion extending forwardly of said vertical portions for manual pushing of said cargo vehicle, and a towing portion extending downwardly from said vertical portion, said towing portion having sufficient length that said towing portion supports said cargo vehicle as a stand, said vertical portions being selectively pivotal for disposing said towing portion forwardly of said cargo vehicle for connection to a motorized vehicle, said gripping portion including a pair of forwardly extending members, hook means on the extending ends of said forwardly extending members, said hook means being located for engaging the upper edges of said side walls of said cargo vehicle when said handle member is in the towing position with said forwardly extending members extending vertically along said side walls of said cargo vehicle.

2. A convertible handle member as claimed in claim 1, said gripping portion further including a grip extending between said forwardly extending members, said grip acting as a gripping means when said handle member is in the manual position and as a stabilizing means when said handle member is in said towing position.

3. A convertible handle member as claimed in claim 2, and including removable fastening means for selectively fixing said vertical members to said walls of said cargo vehicle, and additional removable fastening means for selectively fixing said forwardly extending members to said walls of said cargo vehicle.

4. A convertible handle member in combination with a cargo vehicle whereby said cargo vehicle is selectively adapted for pushing by hand and for towing by motorized vehicle, said cargo vehicle including a body having side walls, said handle member including vertical members pivotally fixed to said side walls of said cargo vehicle, a gripping portion extending forwardly of said vertical portions for manual pushing of said cargo vehicle, and a towing portion extending downwardly from said vertical portion, said towing portion having sufficient length that said towing portion supports said cargo vehicle as a stand, said vertical portions being selectively pivotal for disposing said towing portion forwardly of said cargo vehicle for connection to a motorized vehicle, and further including support flanges on said body of said cargo vehicle, said support flanges lying parallel to said vertical members when said vertical members are rotated to the towing position, said support flanges acting as stops for rotation of said handle member.

* * * * *